United States Patent [19]

Hildebrand et al.

[11] Patent Number: 4,566,399
[45] Date of Patent: Jan. 28, 1986

[54] SLIDER CONTROL

[75] Inventors: Reinhard Hildebrand; Bernd Waldmann, both of Redwitz, Fed. Rep. of Germany

[73] Assignee: Siemens Aktiengesellschaft, Munich, Fed. Rep. of Germany

[21] Appl. No.: 678,373

[22] Filed: Dec. 5, 1984

Related U.S. Application Data

[63] Continuation of Ser. No. 478,344, Mar. 24, 1983, abandoned.

[30] Foreign Application Priority Data

Mar. 26, 1982 [DE] Fed. Rep. of Germany ....... 3211319

[51] Int. Cl.[4] .................. B60Q 9/00; B61D 27/00; H01H 9/04
[52] U.S. Cl. .................. 116/28 R; 165/42; 200/302.1; 200/308; 116/28.1
[58] Field of Search .................. 116/28 R, 28.1, 202, 116/322–324, DIG. 20; 74/566; 165/42, 43; 180/90.6; 200/16 C, 16 D, 302, 304, 308, 310, 312, 317; 277/237, DIG. 7

[56] References Cited

U.S. PATENT DOCUMENTS

| | | | |
|---|---|---|---|
| 3,480,276 | 11/1969 | Torresen | 116/222 |
| 3,582,578 | 6/1971 | Lockard | 200/16 |
| 3,723,692 | 3/1973 | Wilbrecht | 200/168 H |
| 3,757,060 | 9/1973 | Ianuzzi et al. | 200/16 C |
| 3,772,486 | 11/1973 | Wilentchik | 200/16 C |
| 3,929,092 | 12/1975 | Ogura | 116/28.1 |
| 4,165,782 | 8/1979 | Kumagai | 165/11 |

FOREIGN PATENT DOCUMENTS 1211452 11/1970 United Kingdom ....... 116/DIG. 20

Primary Examiner—Charles Frankfort
Assistant Examiner—W. Morris Worth
Attorney, Agent, or Firm—Kenyon & Kenyon

[57] ABSTRACT

A web or band is attached to the sliding actuator or lever of a slider control at the control panel of an automotive vehicle to prevent the passage of light and dust through a slot in the control panel traversed by the actuator. The ends of the web may be free or, alternatively, attached to the actuator to form an endless or continuous band.

3 Claims, 4 Drawing Figures

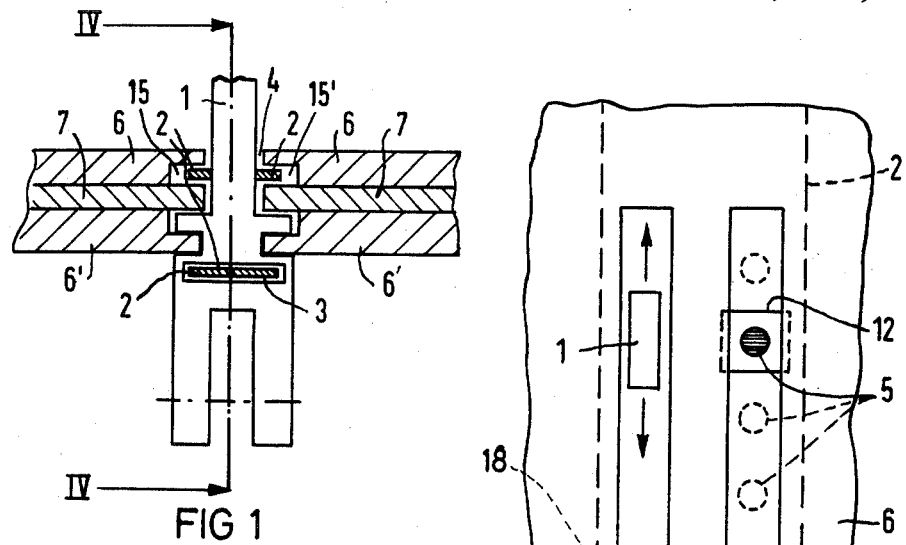
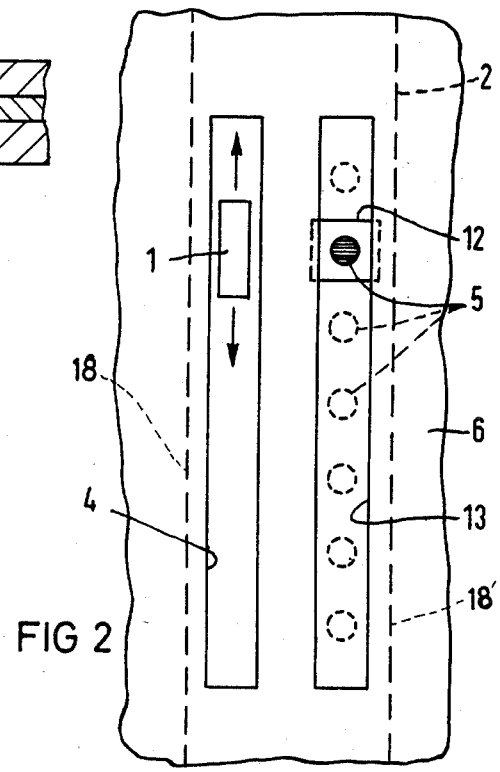
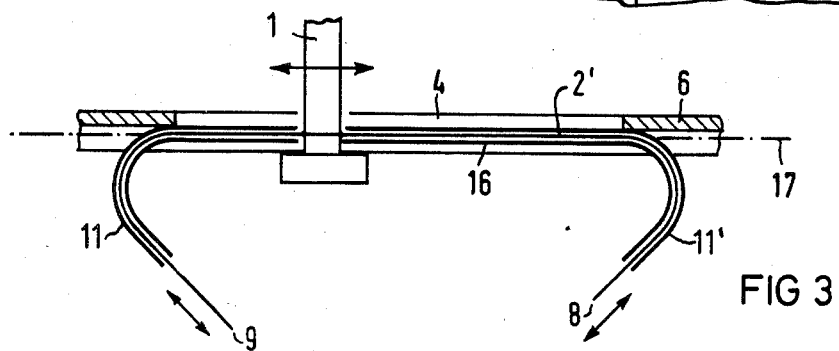
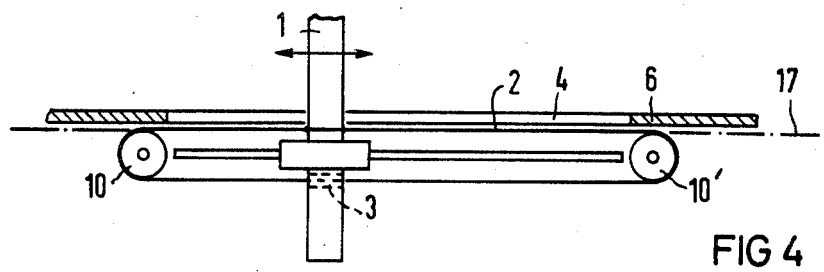

SLIDER CONTROL

This application is a continuation of application Ser. No. 478,344 filed Mar. 24, 1983 now abandoned.

BACKGROUND OF THE INVENTION

This invention relates to a slider control, i.e. a control having a sliding actuator, at the control panel of an automotive vehicle for varying or adjusting the operating state of the heating and ventilating system, and in particular the air conditioning system, of the vehicle.

Heretofore, the leakage of stray light at such a slider control, i.e. the passage of light beams from a source behind the control panel through a slot therein traversed by the sliding actuator, has been inhibited by directly covering the radiant body or light source. This covering has been achieved, for example, by the deposition of vapor on the source or by the interposition of additional parts. The view from the passenger compartment into the space behind the control panel is left unobstructed. Frequently, such a design is troublesome.

An object of the present invention is to provide an improved slider control wherein the passage of stray light beams into the passenger compartment is prevented. Another object of this invention is to prevent the passage of dust through the slot and to thereby retard the accumulation of dust in the spaces behind the control panel.

SUMMARY OF THE INVENTION

In an improved sliding actuator control according to this invention, a web or band is attached to the actuator or lever and, together with the lever, covers up the control panel slot traversed by the lever. The web functions to prevent the passage of light from the radiant body behind the control panel into the passenger compartment and the passage of dust and dirt from the passenger compartment through the slot. The web is advantageously attached behind the control panel to the operating lever. The ends of the web are preferably attached to the lever to form a continuous or endless band. Alternatively, the ends of the web may be free, i.e. unattached.

BRIEF DESCRIPTION OF THE DRAWING

FIG. 1 is a transverse cross-sectional view taken through a portion of the control panel of an automotive vehicle, showing a slider control with an attached web in accordance with the present invention.

FIG. 2 is a front elevational view of a control panel component and the slider control shown in FIG. 1.

FIG. 3 is a longitudinal cross-sectional view through a slider control similar to that illustrated in FIG. 1.

FIG. 4 is a longitudinal cross-sectional view, similar to FIG. 3, taken along line IV—IV in FIG. 1.

DETAILED DESCRIPTION

As illustrated in FIG. 1, a slider control for the heating and ventilating system or the air conditioning system of an automotive vehicle comprises an actuator or operating lever 1 which traverses a slot 4 formed in a control panel or a component 6 thereof. The control panel component faces into the passenger compartment of the automotive vehicle. On a side of panel component 6 opposite the passenger compartment is a light source 7 in the form of an illuminated prism, this prism being sandwiched between panel component 6 and a backing plate 6'.

In accordance with this invention, a web or band 2 is attached to lever 1 on a side panel component 6 opposite the passenger compartment. As shown in FIG. 1, panel component 6 is advantageously provided with a decreased breadth in the region of slot 4, whereby a pair of cross-sectionally rectangular spaces 15 and 15' are formed between panel component 6 and prism 7 at each lateral or longitudinal extending edge of slot 4. A portion of web 2 projects laterally into spaces 15 and 15'.

As illustrated in FIG. 4, web 2 advantageously takes the form of an endless band partially wound about a pair of fixed or rotatable rolls 10 and 10' disposed at opposite ends of slot 4 on a side of panel component 6 opposite the passenger compartment. Endless band 2 can be formed by attaching opposite ends of an elongate strip to lever 1. As shown in FIGS. 1 and 4, lever 1 is provided with an opening 3, rectangular in cross-section, through which band 2 is guided.

As illustrated in FIG. 3, web 2 may alternatively take the form of a band or strip 2' having a pair of free ends 8 and 9 spaced from the point of attachment of strip 2' to lever 1. An elongate guide 16 with a pair of curved ends 11 and 11' is advantageously provided for facilitating the positioning and motion of strip 2'.

Regardless of the particular form web 2 assumes, some portion of the web is located at all times in a plane 17 (see FIGS. 3 and 4) proximate to and parallel to slot 4. The segments of web 2 juxtaposable to slot 4 have a width at least equal to the width of the slot and a combined length at least twice the length of a complete stroke of operating lever 1 along a linear path defined by slot 4.

As illustrated in FIG. 2, lever 1 is preferably attached to web 2 proximately to one edge 18 of a pair of lateral or longitudinally extending edges 18 and 18' of the web. Web 2 is provided with an aperture or cutout 12 disposed proximately to edge 18' and transversely across the web from lever 1, the cutout serving to enable the viewing of symbols such as numerals 5 placed on a surface of prism 7 and representing operating states of the heating and ventilating or air conditioning system. A second slot 13 is formed in panel component 6 in the region of symbols 5, this symbol-viewing slot 5 being laterally spaced from lever slot 4.

What is claimed is:

1. In a slider control of a heating and ventilating system of an automotive vehicle having a passenger compartment and a control panel facing thereinto, said slider control comprising illumination means including a light source on a side of said control panel opposite said passenger compartment for providing a visual display indicating the operating state of said heating and ventilating system, said slider control further comprising actuating means including an operating lever traversing a slot in said control panel for modifying the operating state of said heating and ventilating system, the improvement comprising an endless web attached to the operating lever and a pair of rolls about which said web is partially wound, said rolls being disposed at opposite ends of the slot in the control panel, said web having a length at least twice the length of a complete stroke of said lever along a linear path defined by the slot in the control panel, said web having at all times a web portion disposed in a plane parallel to and proximate to said slot, said portion having a width at least equal to the width of said slot and being movable with said lever in a longitudinal direction parallel to said slot, whereby passage of light and dust particles through said slot is prevented by said web and said lever, said lever including an enlarged portion on a side of said slot opposite the passenger compartment, said enlarged portion being wider than said slot and said web and provided with an opening traversed by a portion of said web spaced from said slot.

2. In a slider control of a heating and ventilating system of an automotive vehicle having a passenger compartment and a control panel facing thereinto, said slider control comprising illumination means including a light source on a side of said control panel opposite said passenger compartment for providing a visual display indicating the operating state of said heating and ventilating system, said slider control further comprising actuating means including an operating lever traversing a slot in said control panel for modifying the operating state of said heating and ventilating system, the improvement comprising an endless web attached to the operating lever and a pair of rolls about which said web is partially wound, said rolls being disposed at opposite ends of the slot in the control panel, said web having a length at least twice the length of a complete stroke of said lever along a linear path defined by the slot in the control panel, said web having at all times a web portion disposed in a plane parallel to and proximate to said slot, said portion having a width at least equal to the width of said slot and being movable with said lever in a longitudinal direction parallel to said slot, whereby passage of light and dust particles through said slot is prevented by said web and said lever, said web having a pair of edges extending at least partially in a longitudinal direction parallel to said slot, said web being attached to said lever proximately to one of said edges, said web being provided with an aperture disposed proximately to the other of said edges and transversely across said web from said lever, said lever including an enlarged portion on a side of said slot opposite the passenger compartment, said enlarged portion being wider than said slot and said web and provided with an opening traversed by a portion of said web spaced from said slot.

3. In a slider control of a heating and ventilating system of an automotive vehicle having a passenger compartment and a control panel facing thereinto, said slider control comprising illumination means including a light source on a side of said control panel opposite said passenger compartment for providing a visual display indicating the operating state of said heating and ventilating system, said slider control further comprising actuating means including an operating lever traversing a slot in said control panel for modifying the operating state of said heating and ventilating system, the improvement comprising a web attached to the operating lever on a side of the slot opposite the passenger compartment, said web having a pair of free ends spaced from said lever and having a length at least twice the length of a complete stroke of said lever along a linear path defined by said slot, said web having at all times a web portion disposed in a plane parallel to and proximate to said slot, said portion having a width at least equal to the width of said slot and being movable with said lever in a longitudinal direction parallel to said slot, whereby passage of light and dust particles through said slot is prevented by said web and said lever, said improvement further comprising means including a web guide stationary with respect to the control panel for facilitating the positioning and motion of said web, said guide including a straight portion at least coextensive length-wise with said slot and extending parallel to said slot and two curved end portions turned away from said control panel in a direction opposite to said passenger compartment, said web having a substantially uniform thickness, each of said curved end portions including a pair of parallel curved components spaced from one another by a distance greater than and approximately equal to the thickness of said web, said web being disposed between said components.

* * * * *